United States Patent [19]

Kawai

[11] Patent Number: 4,611,263
[45] Date of Patent: Sep. 9, 1986

[54] ADJUSTING DEVICE FOR THE OPTICAL AXIS OF A HEADLAMP BEAM

[75] Inventor: Taneichi Kawai, Anjo, Japan

[73] Assignee: Aisin Seiki Kabushiki Kaisha, Aichi, Japan

[21] Appl. No.: 637,253

[22] Filed: Aug. 3, 1984

[30] Foreign Application Priority Data

| Aug. 6, 1983 [JP] | Japan | 58-144142 |
| Aug. 7, 1983 [JP] | Japan | 58-144270 |
| Feb. 23, 1984 [JP] | Japan | 59-32923 |

[51] Int. Cl.⁴ .............................................. B60Q 1/10
[52] U.S. Cl. ...................................... 362/71; 362/272; 362/386
[58] Field of Search ........................ 362/65, 66, 67, 70, 362/71, 420, 428, 802, 69, 61, 80, 272, 286, 386

[56] References Cited

U.S. PATENT DOCUMENTS

| 4,204,270 | 5/1980 | Poirier d'Ange d'Orsay | 362/71 |
| 4,246,628 | 1/1981 | Ikemizu et al. | 362/66 |
| 4,282,561 | 8/1981 | Yano | 362/65 |

FOREIGN PATENT DOCUMENTS

| 2803089 | 6/1979 | Fed. Rep. of Germany | 362/70 |
| 3017395 | 11/1981 | Fed. Rep. of Germany | 362/66 |
| 0155603 | 6/1982 | Fed. Rep. of Germany | 362/66 |
| 3129891 | 6/1982 | Fed. Rep. of Germany | 362/66 |
| 0069338 | 6/1978 | Japan | 362/65 |
| 2101768 | 1/1983 | United Kingdom | 362/66 |

Primary Examiner—Craig R. Feinberg
Assistant Examiner—David A. Okonsky
Attorney, Agent, or Firm—Sughrue, Mion, Zinn, Macpeak & Seas

[57] ABSTRACT

An adjusting device for the optical axis of an automobile headlamp includes a switch for setting the inclination angle or optical axis of the headlamp, and a motor operating in association with control relays and a current supply regulator for adjusting the inclination accordingly. In the event of inclination angle overshoot, the device automatically returns the headlamp to the selected inclination.

9 Claims, 8 Drawing Figures

| VOLTAGE OF POWER SUPPLY | SIGNALS | SIGNAL TIMING |
|---|---|---|
| LOW LEVEL | UP SIGNAL (a) |  |
| | DOWN SIGNAL (b) |  |
| | DRIVING SIGNAL FOR RELAY (c) |  |
| MEDIUM LEVEL | UP SIGNAL (a) |  |
| | DOWN SIGNAL (b) |  |
| | DRIVING SIGNAL FOR RELAY (c) |  |
| HIGH LEVEL | UP SIGNAL (a) |  |
| | DOWN SIGNAL (b) |  |
| | DRIVING SIGNAL FOR RELAY (c) |  |

1

ADJUSTING DEVICE FOR THE OPTICAL AXIS OF A HEADLAMP BEAM

BACKGROUND OF THE INVENTION

This invention relates to a device for adjusting the optical axis of a headlamp beam, particularly in a retractable headlamp assembly for use on automobiles.

Many automobiles now come equipped with retractable headlamp assemblies. The conventional retractable headlamp assembly includes a headlamp located on the front hood which is pivotally mounted so as to be projectable and retractable at will, a motor for driving the headlamp between the projected and retracted positions, and a link mechanism for coupling the headlamp to the motor so that the headlamp may be moved between these two positions.

However, due to changes in the loading of the automobile or road conditions, the optical axis of the headlamp is sometimes displaced from its correct position. Since such displacement misdirects the optical axis of the headlamp beam, the beam may momentary blind drivers in oncoming vehicles.

The conventional retractable headlamp assembly may further include an adjusting device for the optical axis of the headlamp beam (as shown in French Pat. No. 1,592,664). However, this device uses the motor for both pivoting the headlamp and for adjusting the optical axis of the headlamp beam, and in general, a high torque motor is used in order to overcome the load of the link mechanism.

Therefore the headlamp sometimes overruns its predetermined position when the optical axis of the headlamp beam is adjusted. This is because the high torque motor, whose primary purpose is to pivot the headlamps, develops too much torque to stop at the correct position since the optical axis adjusting angle is much smaller than the angle between the projected and retracted positions of the headlamp.

SUMMARY OF THE INVENTION

Accordingly, an object of the present invention is to provide an adjusting device for the optical axis of a headlamp beam, in which the headlamp can be stopped at a fixed position at all times to thereby emit a correctly oriented beam of light.

According to the present invention, the foregoing object is attained by providing an adjusting device for the optical axis of the headlamp beam wherein the adjusting device is provided with current supply regulator means connected to the motor.

In addition, the adjusting device is provided with means for detecting any overrunning of the headlamp and means for returning the headlamp to the predetermined position.

Further, the adjusting device is provided with means for detecting the voltage of the power supply and means for supplying a constant current to the motor.

Other features and advantages of the invention will be apparent from the following description taken in conjunction with the accompanying drawings, in which like characters designate the same or similar parts throughout the figures thereof.

DETAILED DESCRIPTION OF THE PREFERRED EMBODIMENTS

Figure 1:
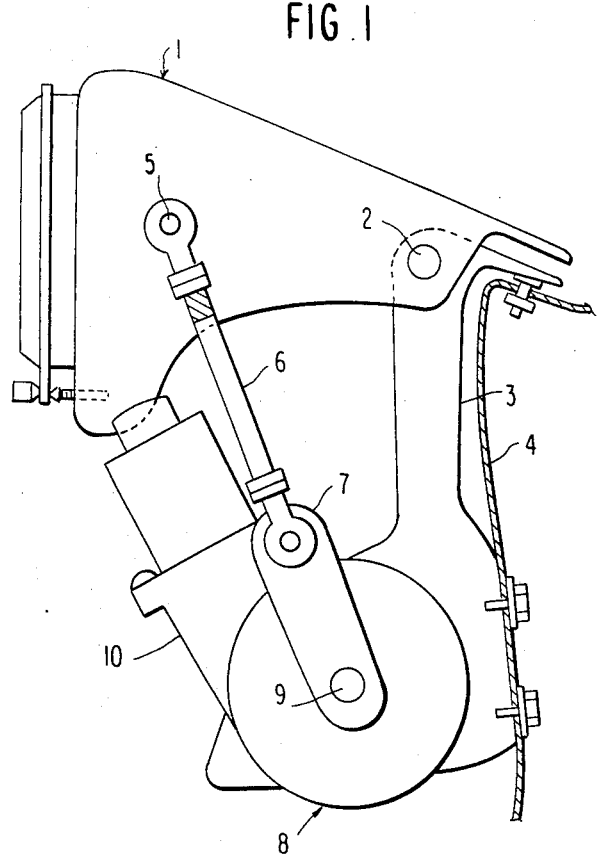
FIG. 1 is a side elevational view of a retractable headlamp assembly for use on an automobile, in accordance with the present invention.

As shown in FIG. 1, the retractable headlamp assembly according to the invention generally comprises a headlamp 1 and a motor 10 for selectively raising or retracting the headlamp 1.

The headlamp 1 is pivotally mounted by a pin 2 on a bracket 3 which is fastened at a suitable point to the automobile frame 4. A lamp link 6 is pivotally mounted at one end by a pin 5, and the other end is operatively connected to an arm 7. The arm 7 is operatively connected to the drive shaft 9 of a gear mechanism 8. The motor 10 is affixed to the bracket 3 and is operatively connected to the gear mechanism 8. The link mechanism comprises the pin 5, the lamp link 6, the arm 7 and the gear mechanism 8. When the headlamp 1 is to be raised to its projected position as shown in FIG. 1, the motor 10 is energized to rotate the drive shaft 9 through the gear mechanism 8, and the arm 7 is rotated to cause the headlamp 1 to be angularly moved about the pin 2 via the lamp link 6. The headlamp 1 is pivoted to its retracted position in a similar manner. One complete rotation of the arm 7 in a given direction effects one complete reciprocation of the headlamp 1, e.g. from retracted to projected to retracted positions.

Figure 2:
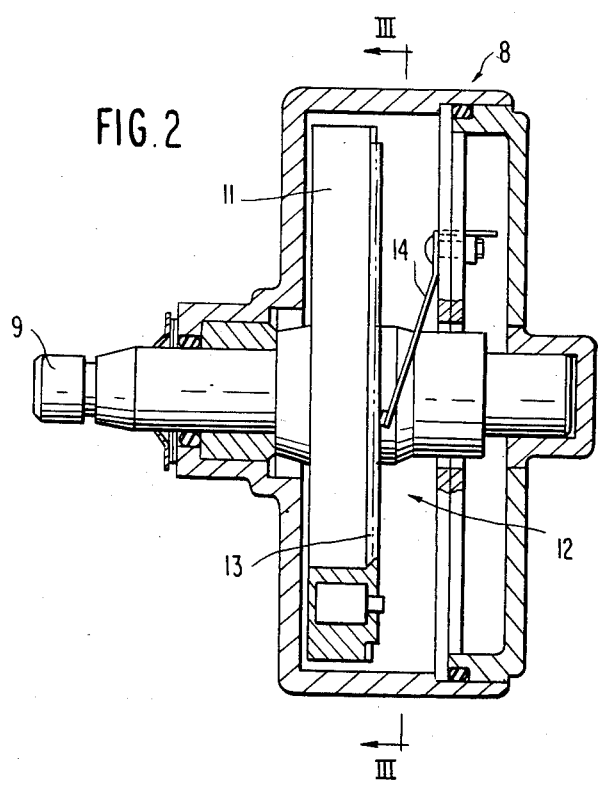
FIG. 2 is a cross sectional view of a gear mechanism thereof.

FIG. 2 shows the gear mechanism 8, which comprises a gear 11 operatively connected to the motor 10 for rotating the drive shaft 9, and a feedback switch mechanism 12 (first switch means). The feedback switch mechanism 12 comprises a brush plate 13 and a brush 14.

Figure 3:
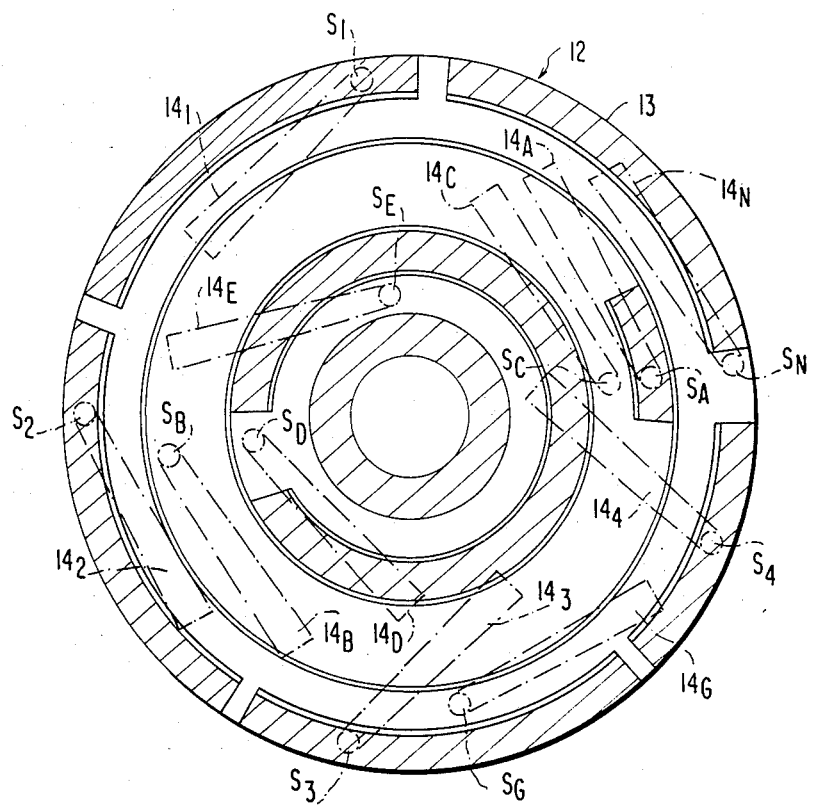
FIG. 3 is an elevational view of a brush plate and brushes which are provided in the gear mechanism.

FIG. 3 shows the feedback switch mechanism 12 in detail. Hatched portions on the brush plate 13 indicate insulated portions. The brushes $14_N$, $14_1$, $14_2$, $14_3$, $14_4$, $14_A$, $14_B$, $14_C$, $14_D$, $14_E$ and $14_G$ have brush contacts $S_N$, $S_1$, $S_2$, $S_3$, $S_4$, $S_A$, $S_B$, $S_C$, $S_D$, $S_E$ and $S_G$, respectively. The brushes contact the brush plate 13 by way of the brush contacts. The brush plate 13 is secured to the gear 11 so as to rotate with the same.

Figure 4:
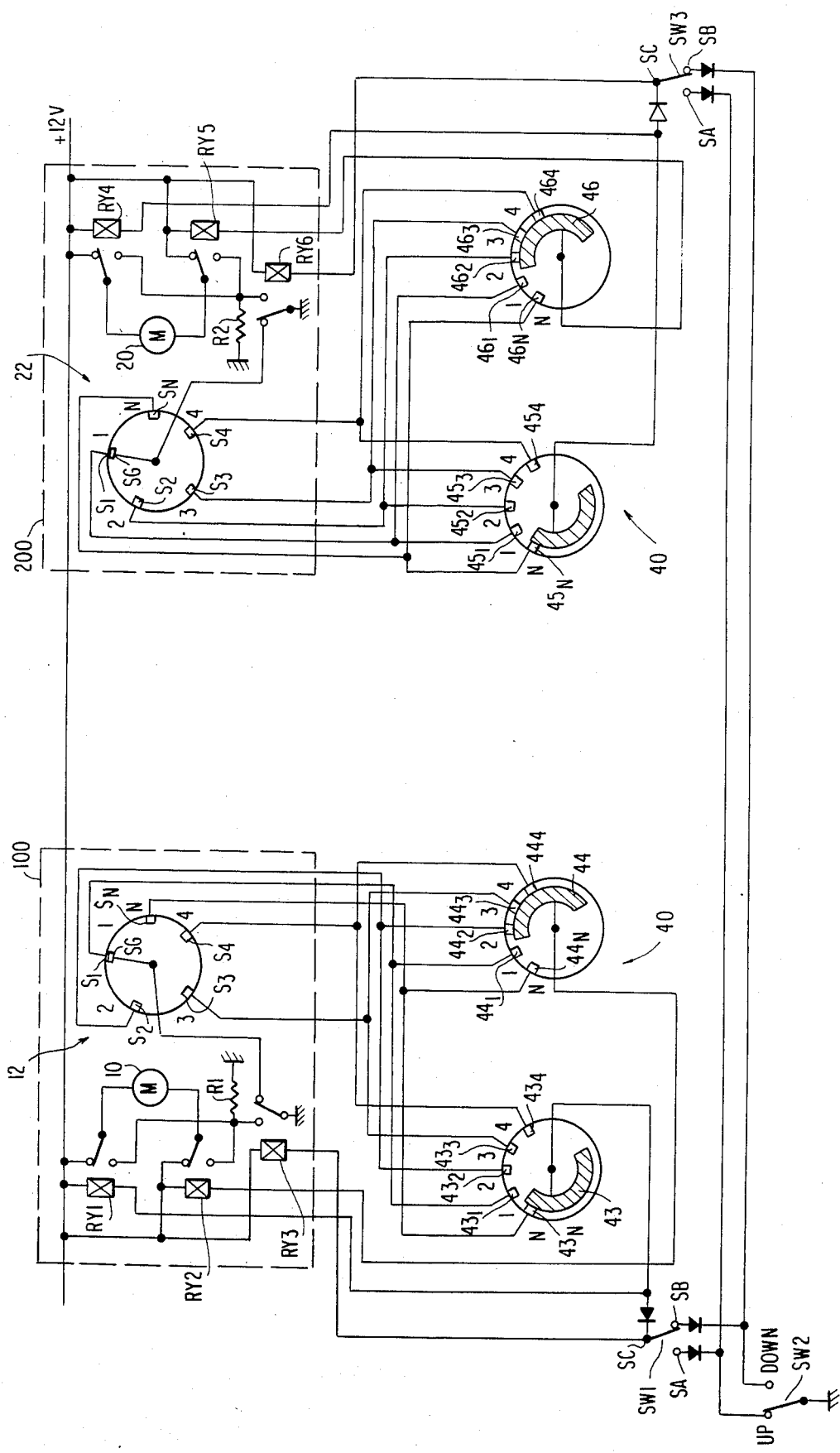
FIG. 4 is an electrical circuit of a device for adjusting the optical axis of the headlamp beam, in accordance with a first embodiment of the present invention.

FIG. 4 shows an electrical circuit for adjusting the optical axis of the headlamp beam. A switch 40 has four groups of contacts, and four selectors 43-46. The contacts of the first group $43_N$, $43_1$, $43_2$, $43_3$ and $43_4$ are connected to the brush contacts $S_N$, $S_1$, $S_2$, $S_3$ and $S_4$, respectively and the contacts of the second group $44_N$, $44_1$, $44_2$, $44_3$ and $44_4$ are also connected to the brush contacts $S_N$, $S_1$, $S_2$, $S_3$ and $S_4$, respectively. The third and fourth groups are similar to the first and second groups in their electrical connections. As two headlamps are provided with the automobile, and as they must be adjusted in the same manner, the electrical circuit has identical portions, one for each of the two headlamps. A circuit 100 for the right side headlamp is provided with the feedback switch mechanism 12, and circuit 200 for the left side headlamp is provided with a similar feedback switch mechanism 22. A selector 43 is capable of contact with four of the contacts of the first group at one time, and the selector 44 is capable of similar contact with four of the contacts of the second group. Selectors 45 and 46 are identical to selectors 43 and 44. The selectors 43, 44, 45, 46 are secured to a shaft (not shown) of the switch 40 and are operated by the automobile driver to adjust the optical axis of the headlamp beam. The selector 43 is connected to a relay RY1 and a common contact $S_C$ of a switch SW1, the selector 44 is connected to a relay RY2, and a relay RY3 is connected to the common contact $S_C$. The relays RY1, RY2, RY3 as shown in FIG. 4 are all in the off state.

The selectors 43 and 44 as shown in FIG. 4 indicate the switch 40 as positioned in the number "1", or first, position. In this embodiment, the switch 40 has five positions which instruct five angles of inclination of the headlamp beam. The five positions are shown in FIG. 4 as N, 1, 2, 3 and 4. When the switch 40 instructs the "1" position, the selector 43 contacts the contact $43_N$ and the selector 44 contacts the contacts $44_2$, $44_3$ and $44_4$ (as shown). When the switch 40 instructs the "3" position, the selector 43 is in contact with contacts $43_N$, $43_1$ and $43_2$ and the selector 44 contacts the contact $44_4$.

The selectors 45 and 46 operate identically to selectors 43 and 44. In FIG. 4, although the four selectors and the four groups of contacts are shown separately, the four groups of contacts can be formed in a plane by concentrically arranging the groups of contacts.

A resistor R1 serves as a current reduction means for reducing the current applied to the motor 10. The resistor R1 is directly connected to the motor 10 by the relay RY2 when the optical axis of the headlamp is adjusted.

The switch SW1 (SW3) is switched when the positions of the contacts $S_A$, $S_B$ and $S_C$ formed on the brushes $14_A$, $14_B$ and $14_C$ are relatively changed by the rotation of the brush plate 13, which has insulated portions as shown in FIG. 3. An up-down switch SW2 for the headlamps is connected to the switch SW1. The position of this switch is manually changed to move the headlamp between the projected and retracted positions.

In operation, with the headlamp in its projected position as shown in FIG. 4, when the switch $S_2$ is switched to the "down" contact, the brush contact $S_B$ is grounded. The relay RY1 and RY3 are turned on and an electric current is applied to the motor 10 via the circuit including the positive line, the contact controlled by RY2, motor 10, the contact controlled by RY1, and the ground level through the contact controlled by RY3. The motor 10 is energized to cause the headlamp to be angularly moved through the link mechanism to the retracted position. With the rotation of the motor 10, the brush plate 13 is rotated, and when the headlamp reaches its retracted position, the brush contact $S_B$ is positioned such that it now contacts the insulating rather than the conductive portion of the brush plate 13. The brush contact $S_A$ now contacts the conductive portion of the brush plate 13. As a result, by changing the switch SW1 contacts from the contact $S_B$ to the contact $S_A$, the relays RY1 and RY3 are turned off.

Described above is the retracting operation. When the switch SW2 is switched to the "up" contact, the brush contact $S_A$ of the switch SW1 is grounded. The relays RY1 and RY3 are turned on and the motor 10 is energized for further rotation in the same direction to cause the headlamp to be angularly moved through the link mechanism to its projected position. The brush plate 13 is thereby rotated, and when the headlamp reaches its projected position, the brush contact $S_A$ will move from its contact with the conductive portion to contact the insulating portion of the brush plate 13, and the brush contact S will change contact from the insulating portion to the conductive portion of the brush plate 13. The switch SW1 changes its engagement from the contact $S_A$ to the contact $S_B$, and the relays RY1 and RY3 are turned off.

The adjusting operation for the optical axis of the headlamp beam is controlled by the switch 40. Operating from the position shown in FIG. 4, when the switch 40 instructs the "1" position, the selector $S_G$ of the feedback switch mechanism is in contact with the brush contact $S_1$, but the contacts $43_1$ and $44_1$ are not in contact with the selectors 43 and 44. Thus, the relays RY1 and RY2 are in their off states. Turning the switch 40 in the clockwise direction to indicate the "2" position, the selector 43 is in contact with contacts $43_N$ and $43_1$ and the selector 44 is in contact with contacts $44_3$ and $44_4$. The contact $43_1$ grounds the selector 43 via selector $S_G$ and the "off" relay RY3, and the relay RY1 is energized. The motor 10 begins to rotate and the brush plate 13 is rotated so as to rotate the selector $S_G$ in the counterclockwise direction. When the selector $S_G$ engages the contact $S_2$, the relay RY1 is turned off because the contacts $43_2$ and $44_2$ do not contact the selectors 43 and 44, breaking continuity through the switch 40. In the same manner, when the switch 40 is turned to a particular clockwise position, the motor 10 rotates the brush plate 13 so as to rotate the selector $S_G$ counterclockwise until the selector $S_G$ is conductive with the first contact not electrically connected to selectors 43, 44. In the operation described above, when the relay RY1 is energized, the motor 10 is supplied with an electric current through the resistor R1. Therefore, the electric current flowing through the motor 10 decreases in correspondence with the voltage drop caused by the resistor R1.

When the switch 40 has instructed the "3" position, for example, the selector $S_G$ will be rotated counterclockwise until conductive with the brush contract $S_3$. (In the "3" position, the selector 43 is in contact with contacts $43_N$, $43_1$ and $43_2$ and the selector 44 is in contact with the contact $44_4$). If the switch 40 is then turned in the counterclockwise direction, for example to the "2" position, the selector 43 will contact the contacts $43_N$ and $43_1$ and the selector 44 will contact the contacts $44_3$ and $44_4$. The selector $S_G$ will ground selector 44 via the contact $44_3$. As a result, the relay RY2 is turned on and the motor 10 is caused to rotate the brush plate 13 reversely so as to rotate the selector $S_G$ in the clockwise direction. When the selector $S_G$ is conductive with the contact $S_2$, the selector 44 is not grounded and the relay RY2 is turned off. Similarly, adjustments of the optical axis of the headlamp between other settings ("3"→"1"; "2"→"1"; "1"→"3", etc.) are carried out in corresponding fashion.

Figure 5:
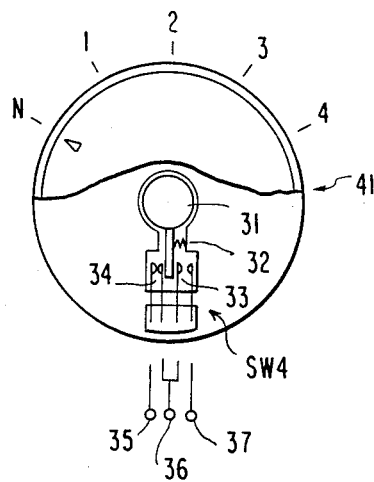
FIG. 5 is an elevational view, with parts in cross section, of a dial for setting the optical axis of the headlamp beam.
Figure 6:
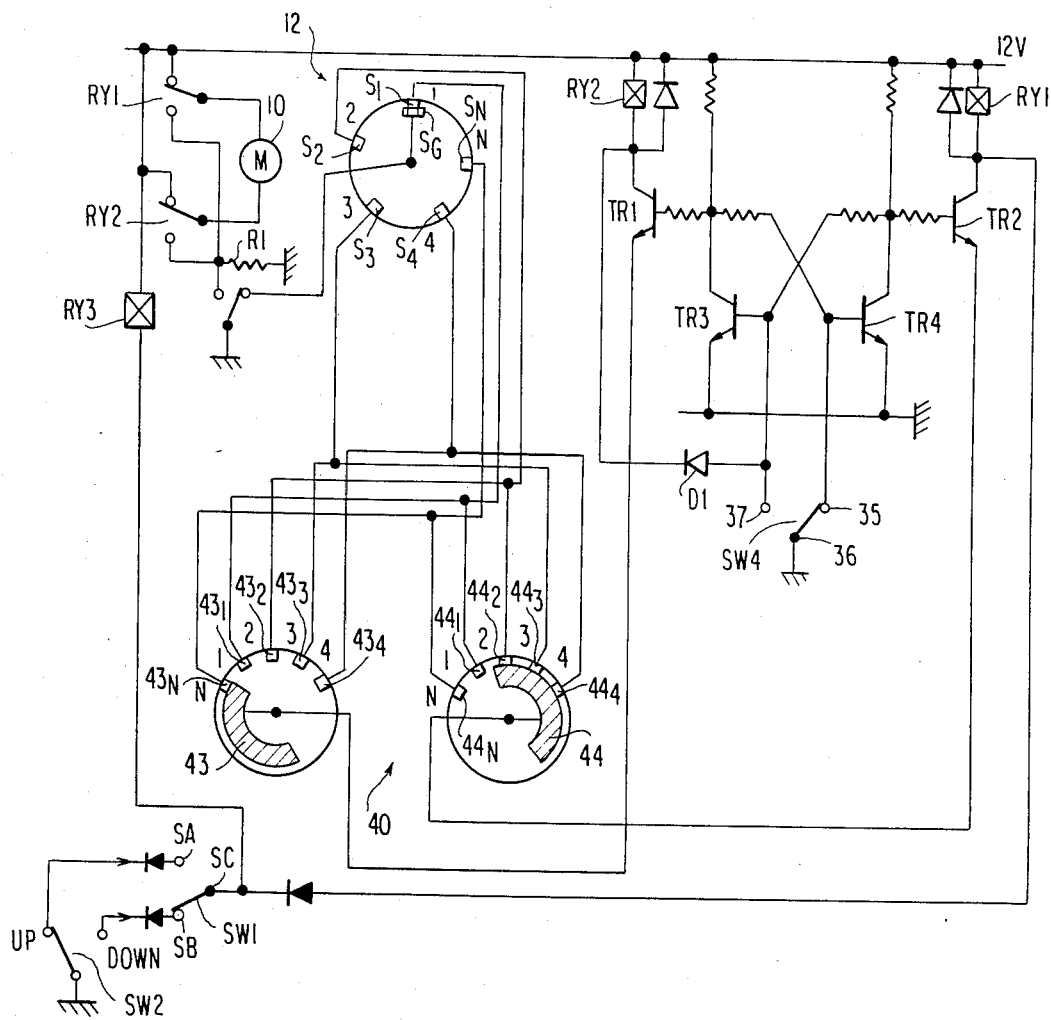
FIG. 6 is an electrical circuit of a device for adjusting the optical axis of a headlamp beam, in accordance with a second embodiment of the present invention.

A second embodiment of this invention is shown in FIGS. 5 and 6. In this embodiment, the headlamp assembly, the link mechanism, the gear mechanism and the feedback switch mechanism are the same as in the first embodiment shown in FIGS. 1 to 4.

FIG. 5 shows a dial 41 which is connected to the switch 40 for adjusting the optical axis of the headlamp beam. The dial 41 has a switch SW4 for detecting the direction of any turning operation. The switch SW4 comprises contacts 33 and 34 and a spring 32. The spring 32 is secured to a projection of the shaft 31, and by the biasing force of this spring, the contacts 33 are normally opened and contacts 34 are normally closed. When the dial 41 is turned in the clockwise direction, that is, in the direction adjusting the optical axis of the headlamp beam downwardly, the contacts 33 are closed as the spring force of spring 32 is overcome, and the contacts 34 are opened. The shaft 31 is then rotated in response to the rotational movement of dial 41 through the contacts 33. On the contrary, when the dial 41 turns counterclockwise, the contacts 33 and 34 keep their normal positions, as the shaft 31 is rotated in response to the rotational movement of dial 41 through contacts 34.

FIG. 6 shows an electric circuit of the second embodiment (but for only one headlamp, for example, the right headlamp, as the circuit for the left headlamp is identical). Numerals in FIG. 6 which are the same as those in FIG. 4 indicate the same members. The switch 40 is connected to the dial 41 and the selectors 43 and 44 are changed in position by the dial 41. The selectors 43 and 44 are connected to emitters of transistors TR1 and TR2, respectively. A collector of transistor TR1 is connected to relay RY2 and a diode D1. The diode D1 is further connected to the contact 37 of the switch SW4 and to the base of transistor TR3. The contact 35 of the switch SW4 is connected to the base of transistor TR4, and the contact 36 is grounded. A collector of transistor TR2 is connected to the relay RY1 and to the common contact Sc of the switch SW1. The relays RY1, RY2 and RY3 as shown in FIG. 6 are all normally turned off.

In the second embodiment, the operation of projecting and retracting the headlamp is the same as in the first embodiment, and in this operation the transistor circuit does not operate. In the optical axis adjusting operation, when the dial 41 of the switch 40 instructs the "1" position, the selector $S_G$ of the feedback switch mechanism 12 is in contact with the contact $S_1$, and in this state, because the selectors 43 and 44 are not in contact with contacts $43_1$, and $44_1$, respectively, the relays RY1 and RY2 remain off. Turning the dial 41 in the clockwise direction, and changing the instruction from "1" to "2", the selector 43 contacts the contacts $43_N$ and $43_1$ and the selector 44 engages contacts $44_3$ and $44_4$. At this time, the contact 37 of the switch SW4 is engaged and the base of the transistor TR3 is grounded. The transistor TR3 thus turns off and the transistor TR4 turns on. The emitter of the transistor TR1 is grounded through the selector 43, the contacts $43_1$, and $S_1$ and the selector $S_G$. Therefore, the transistor TR1 turns on and the relay RY2 is energized. The transistor TR1 keeps its on state because the base of the transistor TR3 is grounded through the diode D1.

The motor 10 is rotated in the direction adjusting the optical axis of the headlamp beam downwardly and the brush plate 13 is turned so as to rotate the selector $S_G$ in the counterclockwise direction. When the selector $S_G$ is conductive with the contact $S_2$, the emitter of the transistor TR1 is cut off from the ground level and the relay RY2 is deenergized.

In the operation of adjusting the headlamp downwardly, because of the headlamp of the headlamp weight it may sometimes happen that the headlamp overruns and does not stop at the correct position. When the headlamp overruns and the selector $S_G$ becomes conductive with the contact $S_3$, the selector 44 is grounded through the contact $44_3$. In this condition the contact 35 is grounded, the transistor TR4 is off and the transistor TR3 is on. Therefore, when the selector 44 is grounded, the transistor TR2 turns on and the relay RY1 is energized. The motor 10 then rotates reversely so as to rotate the selector $S_G$ in the clockwise direction until the selector $S_G$ is conductive with the contact $S_2$. Thus, any overrunning of the headlamp is automatically corrected and the headlamp returned to the predetermined selected position. When the dial 41 is turned in the counterclockwise direction to change the setting from, for example "3", where the selector 43 is in contact with contacts $43_N$, $43_1$ and $43_2$ and the selector 44 is in contact with contact $44_4$, to "2", where the selector 43 contacts the contacts $43_N$ and $43_1$ and the selector 44 is in contact with contacts $44_3$ and $44_4$, the selector 44 is grounded through the contacts $44_3$ and $S_3$. The transistor TR2 turns on and the relay RY1 is energized. The motor 10 accordingly rotates reversely so as to turn the selector $S_G$ in the clockwise direction until the selector $S_G$ is conductive with the contact $S_2$.

Figure 7:
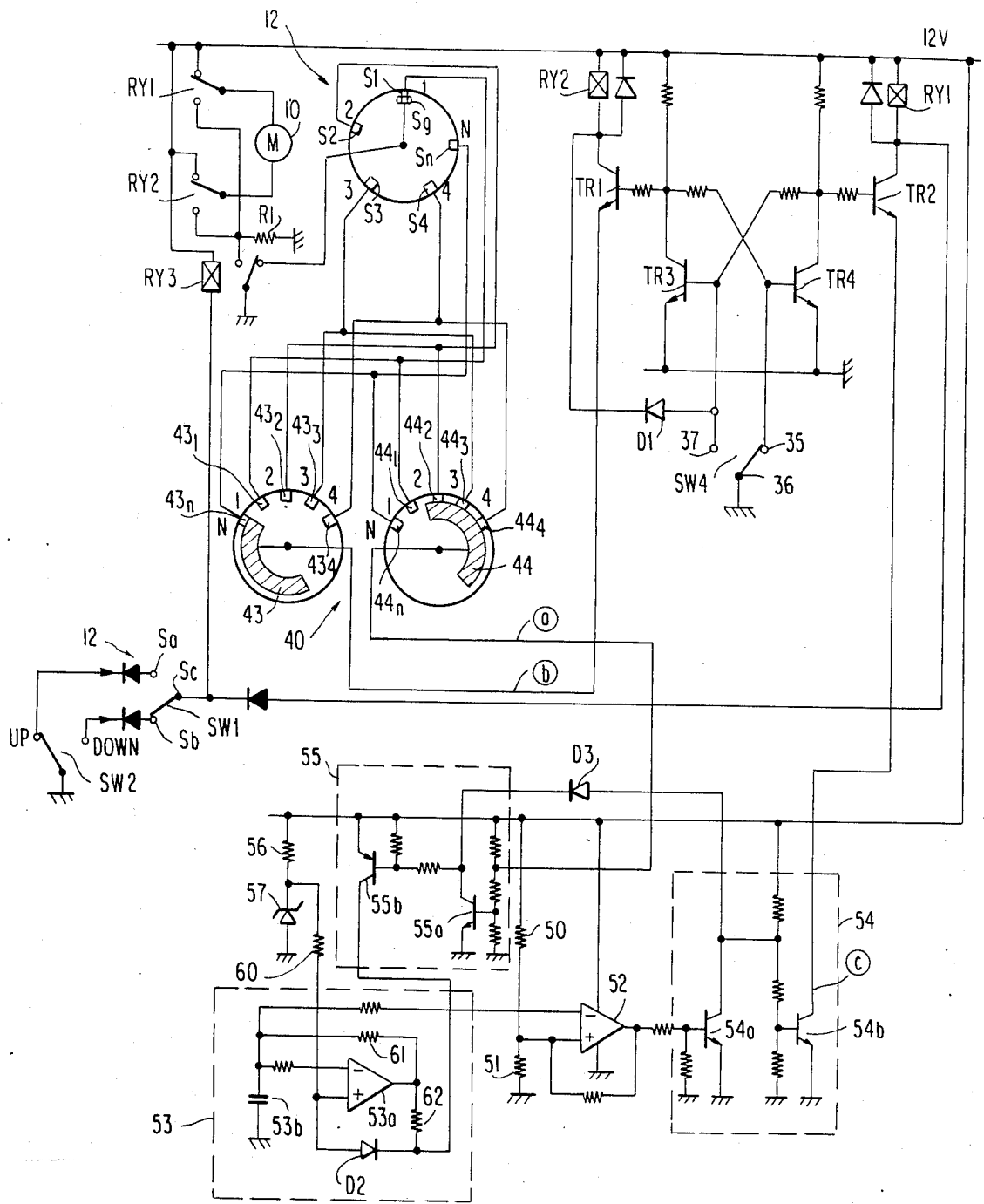
FIG. 7 is an electrical circuit of a device for adjusting the optical axis of a headlamp beam, in accordance with a third embodiment of the present invention.
Figure 8:
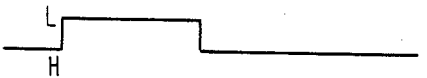
FIG. 8 is a timing chart of signals a, b and c in accordance with the third embodiment shown in FIG. 7.
Figure 8:
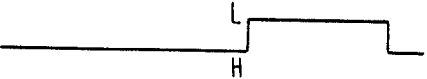
Figure 8:
Figure 8:
Figure 8:
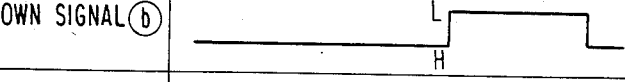
Figure 8:
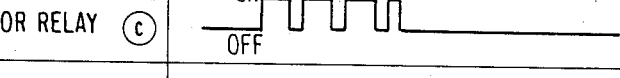
Figure 8:
Figure 8:
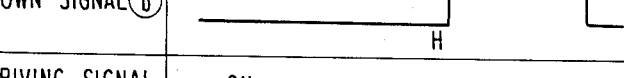
Figure 8:
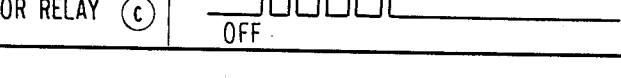

A third embodiment of the invention is shown in FIGS. 7 and 8.

This embodiment is the same as the second embodiment in the basic circuit configuration and so the same numerals are used. This embodiment is provided with a duty ratio control circuit as a current supply regulator means. The duty ratio control circuit comprises resistors 50 and 51 for detecting the voltage of a power supply, a comparator 52, an oscillating circuit 53, a driving circuit 54 for the relays RY1 and RY2, a synchronizing circuit 55 for duty ratio control and a resistor 56 and a diode 57 for setting up a constant voltage. The duty ratio control circuit is disposed between the selector 44 and the emitter of the transistor TR2 shown in FIG. 6 and supplies a relay driving signal c as a duty ratio signal responsive to the power supply voltage during when the switch 40 suplies an "up" controlling signal a (a="L" level signal). When the selector 44 is not grounded (a="H"), transistors 55a and 55b turn on, and the cathode of a diode D2 is connected to the power supply. The diode D2 is thereby reversely biased and the voltage $V_z$ of the diode 57 is supplied to the non-inverting terminal (+) of an operational amplifier 53a. Therefore, the voltage of the inverting terminal (−) of the operational amplifier 53a is stabilized at the voltage $V_z$ and the ouput of the oscillating circuit 53 is stabilized at the peak of the triangular wave. When the output of the comparator 52 is "L" (low level) and transistor 54a turns off, the transistor 55a is turned on so as to ground the base of transistor 54b through a diode D3, thus turning transistor 54b off. Then the transistor TR2 is turned off and the relay RY1 is deenergized. When the selector 44 is grounded, the transistors 55a and 55b are turned off and the cathode of the diode D2 is cut off from the power supply. When the voltage at the inverting terminal (−) is higher than the voltage $V_z$, the output of the operational amplifier 53a is "L" (low level) and the voltage at the non-inverting terminal (+)

is the voltage $V_z$ as divided by the resistors 60 and 62. A capacitance 53b discharges through a resistor 61 to the output terminal of the operational amplifier 53a and when the voltage of the capacitance 53b reaches the voltage $V_z$ the operational amplifier 53a switches to "H" (high level). Then a voltage at the noninverting terminal (+) of the operational amplifier 53a returns to the voltage $V_z$ and the voltage of the inverting terminal (−) is increased by charging the capacitance 53b through the resistor 61.

Thus, when the selector 44 is grounded, the oscillator 53 begins to oscillate to output triangular waves. The comparator 52 supplies a high level (H) signal to the driving circuit 54 when the output of the oscillator 53 is lower than the voltage at the resistor 51 and supplies a low level (L) signal when the output of the oscillator 53 is higher than the voltage at the resistor 51. The voltage at the resistor 51 is determined by dividing the power supply voltage by the resistors 50 and 51. Therefore, the voltage at the non-inverting terminal (+) of the comparator 52 changes corresponding to changes in the power supply voltage. Therefore, the period during which the comparator 52 continues the low level (L) output is lengthened by decreasing the power supply voltage.

As a result, when the selector 44 is grounded, the transistor 54b is turned on and off periodically. When the power supply voltage is high, the duration of the "on" state becomes short, and when the power supply voltage is low, the duration of the "on" state is lengthened. When the transistor TR2 is turned on, the relay RY1 is periodically energized, responding to the transistor 54b being turned on and off. Thus, a constant current is supplied to the motor 10.

In operation, the headlamp projection and retraction procedure is the same as in the first and second embodiments. In the operation of adjusting the optical axis of the headlamp beam, when the switch 40 is switched from the "1" to the "2" settings, that is, in the downward adjustment of the optical axis, the operation is the same as is the second embodiment.

However, when the headlamp overruns the predetermined position, the selector 44 is grounded through the contact 44₃. The synchronizing circuit 55 thus begins to start the oscillating circuit 53, and the transistor 54b turns on and off with a duty ratio corresponding to the power supply voltage. Therefore, in this embodiment, when the headlamp overruns the predetermined position in adjusting the optical axis of the headlamp downwardly, the motor 10 is rotated so as to correct the overshoot by being supplied with a constant voltage.

In the operation of adjusting the optical axis of the headlamp beam, for example, when the switch 40 is switched from the "3" to the "2" setting, the selector 44 is grounded. Therefore, the duty ratio control circuit also supplies a constant current to the motor 10 in such instances.

FIG. 8 shows a timing chart indicating an up signal, a down signal and a driving signal for the relay when the voltage of the power supply is at low, medium and high levels. A more complete understanding of the operation of the third embodiment may be achieved by reference to this figure.

What is claimed is:

1. A device for adjusting the optical axis of a headlamp beam, comprising:
   a bracket adapted to be mounted to an automobile frame;
   a headlamp pivotably mounted on said bracket;
   a lamp link fixed to said headlamp;
   a motor mounted to said bracket and having a rotatable shaft;
   a link mechanism operatively connected to and extending between said lamp link and said rotatable shaft;
   motor control means including;
   means for detecting an inclination angle of said headlamp, and
   means for instructing an inclination angle of said headlamp, said instructed inclination angle being one of a lowered inclination angle and of a plurality of closely spaced inclination angles near a raised inclination angle, said motor being responsive to said instructing means for any of said instructed inclination angles; and
   current supply regulator means for regulating the current to said motor, said regulator means comprising a resistor switchably connectable in series with said motor to vary said inclination angle when said resistor is connected and means for switching said resistor into and out of the current path of said motor.

2. An adjusting device according to claim 1, wherein said current supply regulator means comprises means for detecting a voltage of a power supply and means for supplying a constant current to said motor according to a voltage of the power supply.

3. An adjusting device as recited in claim 1, wherein said detecting means can differentiate between said plurality of closely spaced inclination angles.

4. A device for adjusting the optical axis of a headlamp beam, comprising:
   a bracket adapted to be mounted to an automobile frame;
   a headlamp pivotably mounted on said bracket;
   a lamp link fixed to said headlamp;
   a motor moutned to said bracket and having a rotatable shaft;
   a link mechanism operatively connected to and extending between said lamp link and said rotatable shaft;
   motor control means including;
   means for detecting an inclination angle of said headlamp,
   current supply regulator means for selectively regulating a current to said motor to any of at least two predetermined non-zero current magnitudes, and
   means for instructing an inclination angle of said headlamp, said instructed inclination angle being one of a lowered inclination angle and of a plurality of closely spaced inclination angles near a raised inclination angle, said motor being responsive to said instructing means for any of said instructed inclination angles;
   wherein said instructing means includes coarse instructing means for instructing a change of inclination angle between said lowered and said raised inclination angle and for simultaneously causing said current supply regulator means to regulate said current to a larger of at said current magnitudes.

5. An adjusting device according to claim 4, further comprising means for detecting an overrunning of said headlamp upon movement caused by said coarse instructing means and means for returning said headlamp to the instructed angle.

6. An adjusting device according to claim 4, wherein said current supply regulator means comprises means for detecting a voltage of a power supply and means for supplying a constant current to said motor according to a voltage of the power supply.

7. An adjusting device as recited in claim 4, wherein said detecting means can differentiate between said plurality of closely spaced inclination angles.

8. An adjusting device as recited in claim 4, wherein said instructing means further includes fine instructing means for instructing a change of inclination angle between two of said plurality of closely spaced inclination angles and for simultaneously causing said current supply regulator means to regulate said current to a magnitude smaller than said larger current magnitude.

9. An adjusting device as recited in claim 8, wherein said coarse instructing means includes means for causing said motor to rotate only in a single direction and said fine instructing means includes means for causing said motor to rotate in a direction dependent upon the direction of instructed change of said fine instructing means.

* * * * *